Sept. 25, 1951        G. C. ELTENTON        2,569,127

REFRACTIVE INDEX MEASUREMENT OF FLUIDS

Filed July 6, 1946        2 Sheets-Sheet 1

Inventor: George C. Eltenton

By his Attorney

Patented Sept. 25, 1951

2,569,127

UNITED STATES PATENT OFFICE 2,569,127

REFRACTIVE INDEX MEASUREMENT OF FLUIDS

George C. Eltenton, Berkeley, Calif., assignor to Shell Development Company, San Francisco, Calif., a corporation of Delaware Application July 6, 1946, Serial No. 681,754

7 Claims. (Cl. 88—14)

This invention pertains to refractivity measurements, and to a system for effecting and applying refractive index measurements to the control of operating conditions in industrial installations, plants, laboratories, etc.

There are many applications in the chemical and other industries for an apparatus capable of continuously measuring and indicating or recording the refractive indices, and their variations, of various fluid compounds, either as an aid to the control of the composition, purity, temperature, and other properties or characteristics of said compounds, or as a direct means for automatically applying such control.

For example, the degree of conversion of dimethylcyclopentane to methylcyclohexane in isomerization processes, or of methylcyclohexane to toluene in hydrogenation processes may be continuously recorded and controlled by means involving refractive index measurements.

Factors affecting the refractive index, such as temperature, degree of admixture of a substance with another substance, such as water, etc., can be measured, recorded and controlled in a similar way. For example, in the solvent extraction of pentadienes by means of dimethyl sulfolane, the water content of the latter can be controlled within narrow limits by means involving refractivity measurements. In a similar manner, the present system may be used to measure and record or control the water content of sugars, the viscosity index of oils, etc.

It is therefore an object of this invention to provide an apparatus or system for continuously measuring and recording the refractive index of a fluid substance, and for controlling the properties or characteristics of said fluid substance in response to variations in said refractive index.

It is a particular object of this invention to provide a multiple reflection photoelectric refractometer especially suitable for automatically effecting refractive index measurements for purposes of such control.

These and other objects of this invention will be understood from the following description taken with reference to the attached drawings, wherein.

Figure 4:
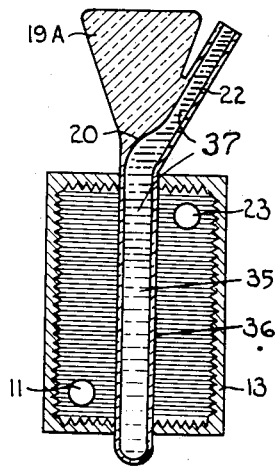
Fig. 4 shows a modified type of transparent rod for the device of this invention.

When a ray of light passes from one medium to another medium of different refractivity, the relation between the refractive indices of the two media, $N_1$ and $N_2$, and the angles of incidence and of emergence or refraction, I and R, is determined by Snell's law: $N_1 \sin I = N_2 \sin R$.

When a ray of light passes from a medium of greater refractivity to a medium of lesser refractivity, the angle of emergence is greater than the angle of incidence. Since the angle of emergence cannot exceed 90 degrees it follows from Snell's law that when the angle of incidence exceeds a critical value $I_c$ given by $\sin I_c = N_2/N_1$ all the light striking the surface at angles equal to or greater than $I_c$ will be totally reflected and none of this said light will emerge into the liquid.

When a ray of light passes through a medium having plane surfaces which are not parallel, such as a prism, the deviation of the incident ray on entering the prism is not exactly compensated on emerging from the second surface. The total deviation of a ray in passing through the prism has a minimum value when the incident and the emergent ray are symmetrical with regard to the refracting angle of the prism.

These properties are used in measuring refraction indices. For example, in the critical angle refractometers, the Abbé or the dipping refractometers, a sighting device such for example as a telescope is positioned so that its optical axis makes, with the normal to the surface of the prism from which the ray emerges, an angle equal to the critical emergence angle of the ray. The field of the sighting device is then sharply divided into two parts, one light and one dark. A measurement of the shift of position of the line of demarcation between the two fields when dealing with substances of different refractivity permits a determination of the refractive indices of these substances.

Although the measurement of the refractive index of various liquids can be effected and applied for desired control purposes by means of different systems, the present control method will be described particularly with regard to the multiple reflection refractometer of this invention, which is preferred for this purpose as being free of drawbacks attendant the use of other refractometers. In order to be able to measure the refractive indices of opaque or substantially opaque fluids, and to achieve independence from variations in light intensity arising from variations in the color and light-absorbing properties of the liquids under test, it is preferred, according to the present invention, to measure and to compare refractive indices without passing the light through the fluid under test.

The Abbé refractometer can be used in this manner, especially in opaque fluids, by utilizing the effect of total reflection at the critical angle, as outlined above. However, the demarcation line or the contrast between the dark and the light fields is in such cases much less pronounced than the contrast obtained when using the light transmission effect in transparent fluids, whereby the ease of calibration, the accuracy and the sensitivity of the device are decreased.

The reason for this lack of sharpness is that, the light beam being reflected only once, the contrast between the bright and the dark field is actually the contrast between the light intensity due to total reflection and the light intensity due to a high degree of partial reflection.

The multiple reflection refractometer of the present invention is therefore provided to intensify the contrast between the bright and the dark field by causing the light to be reflected several times instead of one, whereby the totally reflected component suffers no diminution of intensity, whereas the partially reflected component decreases in intensity at each reflection, as will be shown hereinbelow.

Figure 1:
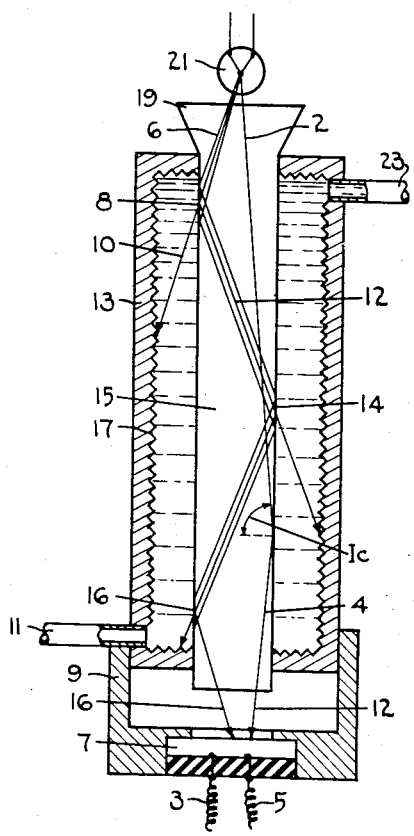
Fig. 1 is a diagram illustrating the principle of this invention.

Referring to Fig. 1, which illustrates diagrammatically the principle of this invention, the present refractometer comprises essentially an elongated cylindrical or rod element 15 made of glass or of other suitable transparent material. One of the ends of the cylinder 15 is somewhat enlarged, being given, for example, a funnel-shaped or frusto-conical shape as shown at 19, to increase the amount of light received by the cylinder from a source of light 21. The use of enlargements at the end of the cylinders 15 has been found of great importance in decreasing the sluggishness of the system while increasing its sensitivity (slope of the response curve) by modification of the angular spread of the incident light.

The cylindrical element 15 is encased in a tubular housing 13 completely filled with a fluid whose refractive index it is desired to measure. The fluid may either remain stationary in the housing 13, or circulate therethrough by means of pipes 11 and 23, connected to suitable reservoir or pumping means, not shown.

The inner walls of the housing 13, which may be made of any suitable material, such for example a metal, a plastic, etc., are carefully treated so as to absorb any light penetrating the fluid, without reflecting substantially any of said light back toward the glass cylinder. It has been found especially advantageous for this purpose to provide said inner walls with a corrugated surface such for example as obtained by screw-threading. Thus, if the housing 13 is made as a hollow brass or copper cylinder, its inner walls may be provided with relatively fine screw threads, and then treated with a blackening agent, such as a solution of potassium polysulphide, thus giving a substantially non-reflecting surface wherein each screw-thread effectively acts as a light trap.

A light-sensitive element such as a photocell 7, held by means such as a hub or cover 9, adapted to exclude outside light, is arranged near the end of cylinder 15 axially opposite the light source 21. The photocell 7 produces an electric current proportional to the amount of light impinging thereon through the cylinder 15, and this current is transmitted, through leads 3 and 5, to suitable indicating, recording or control means, as will be described and illustrated hereinbelow.

The photocell 7 will be impinged upon by both totally reflected and partially reflected light rays passing through the rod 15. Given a transparent rod 15 and a surrounding fluid each having a particular refractivity index, it may be assumed for illustration purposes that all light rays such as 2, having an incidence angle equal to, or greater than $I_c$, will be totally reflected. The totally reflected light rays, such as 4, will therefore strike the photocell 7 without any loss of intensity other than that due to transmission through the cylinder or rod 15.

All light rays such as 6, having an incidence angle smaller than $I_c$, however, will be partially reflected and partially refracted into the fluid surrounding the rod 15, as shown at 8, the refracted rays following a path 10, and the reflected rays following a path 12. It will be noted that if the ray 6 has an intensity equal to that of ray 2, the ray 12 will have a lesser intensity than the ray 4 due to the loss of the ray 10 to the surrounding fluid.

The phenomenon of partial reflection and partial refraction being then successively repeated at all points such as 14 and 16, wherein the reflected ray strikes the boundary between the transparent rod 15 and the surrounding fluid, it will be seen that the partially reflected ray 16, finally striking the photocell, will be of a greatly attenuated intensity as compared with the original rays 6 and 2 or the totally reflected ray 4. By providing a transparent rod 15 of sufficient length, the intensity of the partially reflected rays, such as ray 16, and their effect on the photocell may be rendered negligible for all practical purposes.

The optimum length of the glass rod, and its ratio to the diameter thereof necessary to give the above result may be derived from theoretical considerations. It has moreover been found in practice that, for example, with an annealed Pyrex rod of 10 mm. diameter, an increase in length in excess of 150 mm. or about 6 inches brings no appreciable variations in the intensity of the current produced by a photocell exposed to light passing through the rod in contact with a liquid such as glycerine. A rod diameter-rod length ratio of from 1:15 (for relatively long rods, such as 6 inches) to 1:8 (for relatively short rods, such as 2 inches) is therefore usually satisfactory for the purposes of the present invention.

The transparent material of which the rod of the present device is made should be selected so as to have a refractive index approaching as closely as possible that of the fluid under test, since the present device operates at its greatest sensitivity in a region where the difference between said refractive indices is small. In dealing with fluids having a relatively low refractive index, this rod may therefore be constructed, as shown in Fig. 4, in the form of a hollow cylinder 35, having preferably very thin transparent walls 36 and completely filled with a fluid 37, by means of a pipe 22 disposed so as to permit no accumulation of air bubbles under the slanting lower face 20 of the enlarged portion 19A of the rod, which is made of solid glass. The refractive index of this fluid is selected so as to approach but still be somewhat higher than the anticipated value of the fluid to be tested.

It has also been found that by using the present device to measure the relative value of the unknown refractive index of a particular liquid with regard to the known refractive index of a liquid used as a standard, greater sensitivity and accuracy can be achieved by eliminating or decreasing the effects of temperature and light intensity variations.

Figure 2:
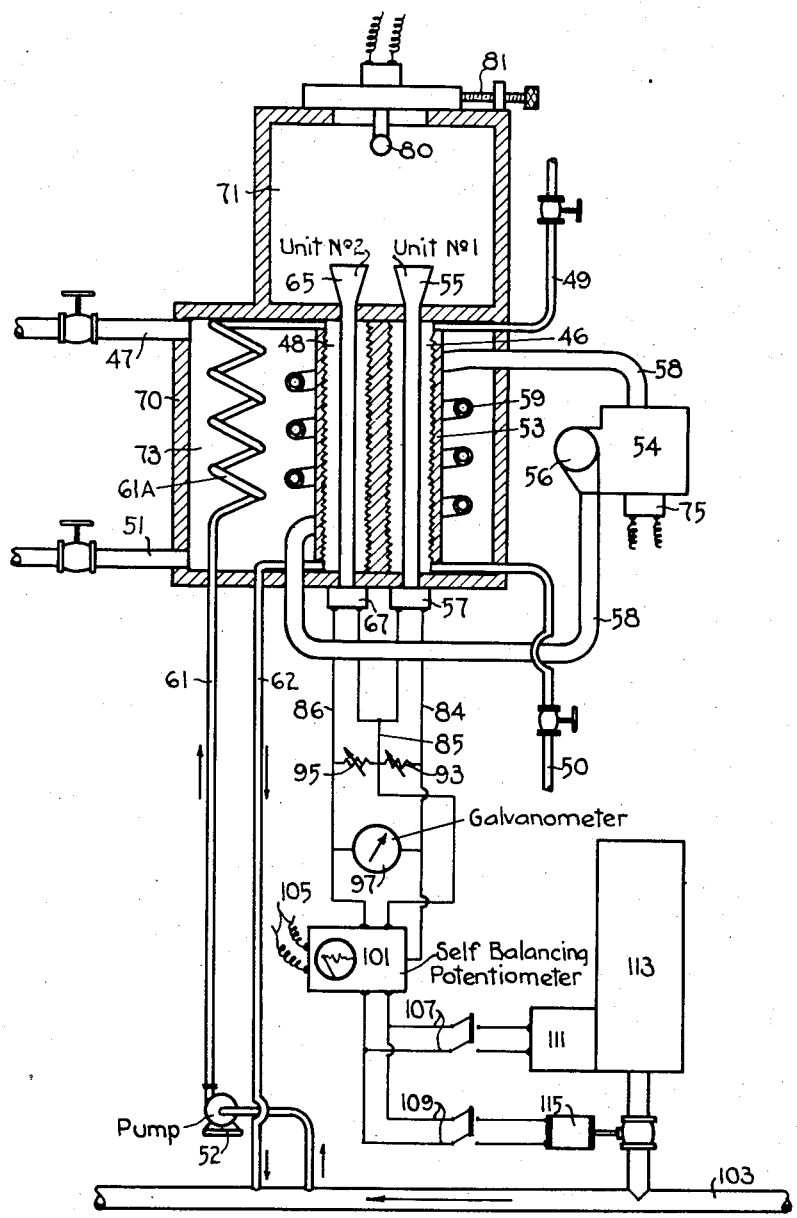
Fig. 2 is a diagrammatic representation of a control system embodying this invention.

For this purpose, an arrangement such as shown in Fig. 2 may be used.

The system of Fig. 2 comprises two refractometer units each similar to that of Fig. 1. The first unit has a transparent cylinder or rod 55 enclosed in a compartment 46 of a housing 53, filled with a standard liquid whose refractive index and temperature coefficient approximate those of the fluid under measurement. The standard liquid may be supplied to unit No. 1 and removed therefrom from any desired source by means of pipes or conduits 49 and 50, provided with suitable valves or stopcocks.

The second unit has a transparent cylinder or rod 65 enclosed in a separate housing, or in a separate compartment 48 of the same housing 53, which is filled with the particular liquid whose refractive index it is desired to measure. This liquid may be supplied to the housing 53 from any desired source, such as a tank, reservoir, reboiler, etc., or, as shown in Fig. 2, for illustration purposes, from a pipe 103 carrying a desired liquid or product. For example, a stream of the liquid flowing in pipe 103 may be taken off by means of a pump 52 and circulated through compartment 48 by means of conduits 61 and 62.

The two refractometer units are enclosed in an outer casing 70 having for example an upper compartment 71 and a lower compartment 73.

The lower compartment 73 can be filled with any desired liquid by means of a pipe 47, while pipe 51 may be used to remove said fluid. Any desired means, such as thermostat-controlled means, may be used to maintain the temperature of this liquid and that of the refractometer units at a constant value. Fig. 2 shows by way of illustration a system wherein a heating or cooling coil 59 is immersed in compartment 73, and a liquid is circulated therein by means of pipe 58 and pump 55 from a reservoir 54, kept at a desired constant temperature by means of thermostatic controller 75.

In order to permit the liquid under test to reach the standardized temperature of the liquid in compartment 73, conduit 61 may be provided with a coil 61A within compartment 73.

The upper compartment 71, which is constructed so as to exclude all outside light therefrom, holds the light train or optical elements of the present apparatus, such as the enlarged ends of the transparent rods 55 and 65 and a light source 80, whereby the light is directed through the rods 55 and 65. The light source 80 is arranged so as to be laterally movable by means, for example, such as an adjusting screw 81, in a plane passing through the axis lines of the transparent rods, whereby the relative amounts of the light received by each rod may be modified for proper adjustment of the reading scale of the indicating device, as will appear hereinbelow. It will be seen that since a single source of light is used for both units, random variations of light intensity, due for example to small variations in the voltage applied to lamp 80, will not affect the relative values of the light reaching photocells 57 and 67 through the transparent rods 55 and 65.

The photocells 57 and 67 are connected by means of leads 84, 85 and 86, to form a measuring bridge with variable resistances 93 and 95 and an indicating device 97, preferably of the zero indicating type such as a galvanometer.

To measure and control the refractive index of a desired liquid by means of the present system, the system is first calibrated by filling both refractometer units with a standard liquid whose refractive index is known or has been measured by any desired means, for example, with an Abbé refractometer.

Figure 3:
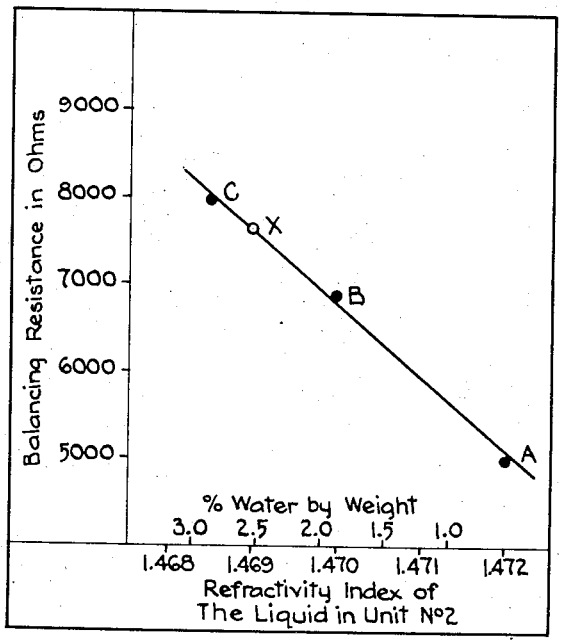
Fig. 3 is a calibration chart illustrating an application of this invention.

The measuring bridge resistance 93 is given a suitable setting, consistent with the sensitivity required, and the bridge resistance 95 is adjusted until the galvanometer 97 gives a zero reading. The setting of the resistance 95, for example, 5000 ohms is noted, and the unit No. 2 is thereafter filled with another liquid of known refractive index, unit No. 1 remaining filled with the first standard liquid. The setting of the resistance 95 necessary to bring the galvanometer 97 to a zero reading under these changed conditions is again recorded. These operations are repeated with liquids of known refractive indices a sufficient number of times to give a calibration curve wherein the known refractive indices of the liquids in unit No. 2 are plotted against the settings of the bridge resistance 95, as shown at A, B and C in Fig. 3.

Once calibrated, the preesnt refractometer can be used to determine the refractive indices of unknown liquids by retaining the standard liquid in unit No. 1, filling unit No. 2 with the unknown liquid, and referring the resistance setting necessary to give a zero galvanometer reading to the calibration chart. Thus, for example, if the resistance setting necessary to balance the bridge is 7500 ohms, the calibration chart readily gives 1.469 as the refractive index of the liquid in unit No. 2, as shown at X in Fig. 3.

If it is desired to use the present refractometer system for automatically recording the changes of the refractive index of a liquid and/or for automatically controlling a desired condition or conditions in the operation of a plant or plant installation, the measuring bridge circuit comprising resistances 93 and 95 and galvanometer 97 may be replaced by, or, as shown in the drawing, connected in parallel, directly or through desired resistances, with a self-balancing potentiometer or recorder-controller 101 such for example as those manufactured by the Brown Instrument Company (Bulletin No. 15—4, 1942), the Tagliabue Manufacturing Company (Catalog No. 1101 E, 1939), the Leeds-Northrup Company (Catalog No. 33—161, 1940), etc.

The self-balancing potentiometer and controller, which is supplied with an operating current from any desired source through leads 105, rebalances itself, in well-known manner, after any condition of unbalance caused by variations of the currents supplied by the photocells 57 and 67. In rebalancing itself, the recording and controlling potentiometer 101 delivers an energizing current, which serves to produce the desired record and which is also applied through leads 107 or 109, or both, to control the operation of elements such as the heater 111 of a re-boiler, fractionating column or other unit 113, or the degree of closure of an automatic valve 115, etc., which in turn control the desired operating conditions.

Assuming that it is desired to keep the composition of the liquid flowing in the pipe 103 at a desired standard value corresponding to a predetermined refractive index, for example 1.470, the sequence of operations for an automatic control according to the present invention may be described as follows by way of an illustrative example:

The liquid flowing in pipe 103 is continuously sampled, the sample stream being passed through the refractometer unit No. 2 by means of conduits 61 and 62.

If the composition of said liquid changes, due for example, to increasing water concentration caused by an insufficient amount of heat applied to column 113 by the heating element 111, or by too large an amount of the liquid from the column 113 admitted to pipe 103 through the automatic valve 115, this change is reflected in a corresponding change of the refractive index of the liquid.

The amount of light received by photocell 67, and the current supplied by said cell to the potentiometer 101 being thus changed, the potentiometer 101 rebalances itself to the new conditions, and in so doing supplies an energizing current to the control element of the heater 111 or the valve 115, or both, which changes the setting of these elements, for example, so as to increase the heat input to the column 113 or to decrease the amount of liquid passing through valve 115, thus acting to bring the liquid in pipe 103 back to a composition having the desired refractive index.

Figure 5:
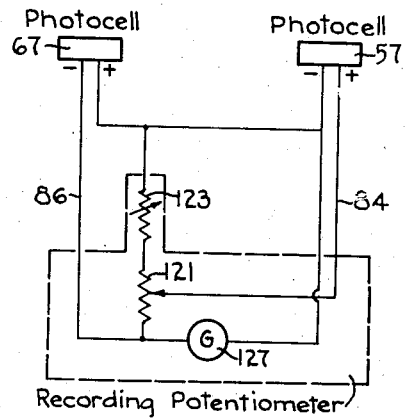
Fig. 5 is a connection diagram for a recording potentiometer used in the system of the present invention.

Fig. 5 shows a slightly modified connection diagram of the recording and controlling potentiometer shown at 101 in Fig. 2. Since these instruments are usually provided with a constant resistance potentiometer wire 121 the sensitivity, that is, the number of scale divisions of the galvanometer 127 corresponding to a unit change of refractive index may be controlled within wide limits by addition of a variable external resistance 123. Thus if an external resistance 123 of 180 ohms be added to one end of the potentiometer wire whose resistance 121 is 20 ohms, the sensitivity of the device will be increased ten times.

In using a recorder it is therefore convenient to employ a single external resistance 123, which controls the sensitivity, and to adjust the position of the pointer on the scale of the indicator 127 to read zero at one of the extremes in the refractive index range required. This adjustment is made by moving the light source 80 or by shading one of the photocells so as to favor one or other of the rods. During this adjustment unit No. 2 should contain the calibrating liquid whose index coincides with the lower or upper end of the index range, while unit No. 1 contains the standard liquid whose index may fall approximately in the middle of the range. By using matched photocells and temperature control, it is possible to achieve continuous records which compare favorably in sensitivity and reproducibility with the Abbé type of refractometer.

It is understood that all examples were given hereinabove merely by way of illustration and that the scope of the present invention and its application for purposes of industrial control are in no way limited thereby, being defined only in the claims hereinbelow.

I claim as my invention:

1. An apparatus for measuring the refractive index of a fluid, comprising a closed compartment adapted to be filled with said fluid, an elongated cylindrical rod of transparent material extending through the compartment and sealed at the regions of entrance to and exit from the compartment, means comprising a source of light arranged exteriorly of the compartment adjacent one end of the rod for passing light beams through the rod in an axial direction, and light sensitive means arranged exteriorly of the compartment adjacent to other end of the rod for measuring the light emerging from the rod substantially by multiple internal reflection from the interface between said rod and said fluid, the amount of said light being a function of the refractive index of said fluid.

2. The apparatus of claim 1 wherein the transparent rod is made in the form of a hollow cylinder having thin walls made of a transparent material, said cylinder being adapted to be filled with a transparent fluid.

3. An apparatus for measuring the refractive index of a fluid, comprising a closed compartment adapted to be filled with a fluid of known refractive index, an elongated cylindrical rod of transparent material extending through the compartment and sealed at the regions of entrance to and exit from the compartment, a second compartment adapted to be filled with a fluid of unknown refractive index, an elongated cylindrical rod of transparent material extending through said compartment and immersed in the fluid therein, means comprising a single source of light arranged exteriorly of the compartments adjacent one end of each of said rods for passing light beams axially through the rods, means comprising light sensitive elements arranged exteriorly of the compartments adjacent the other ends of the rods for producing electrical currents proportional to the amount of light passing through each of said transparent rods substantially by virtue of internal reflection determined by the refractive indices of said fluids, and measuring bridge circuit means electrically connected to said light sensitive elements for indicating the relative intensities of said currents.

4. The apparatus of claim 3 comprising a housing surrounding the two compartments, said housing being adapted to be filled with a fluid, and thermostatically controlled means in said housing for maintaining the temperature of said fluid at a predetermined constant value.

5. An apparatus for measuring the refractive index of a fluid, comprising a closed compartment adapted to be filled with said fluid, an elongated cylindrical light-transmitting body extending through the compartment, said body being in contact with said fluid over the total cylindrical surface of said body located within said compartment, means comprising a source of light arranged exteriorly of the compartment adjacent one end of the cylindrical body for passing light therethrough in an axial direction, and light sensitive means arranged exteriorly of the compartment adjacent the other end of the cylindrical body for measuring the light emerging therefrom, the amount of said light being a function of the refractive index of the fluid.

6. An apparatus for measuring the refractive index of a fluid, comprising a housing having two compartments, one of said compartments being adapted to be filled with a fluid of a known refractive index, and the other with a fluid of an unknown refractive index, elongated cylindrical means made of a light-transmitting material extending within the housing through said two compartments in contact with the fluids therein, means comprising a source of light arranged exteriorly of the housing adjacent said cylindrical means at one end thereof for passing light axially through said cylindrical means, means comprising light sensitive elements arranged exteriorly of the housing adjacent said cylindrical means of the other end thereof for producing electrical currents proportional to the amounts of light emerging from said cylindrical means by virtue of the respective refractive indices of the two fluids in contact therewith, and measuring means electrically connected to said light sensitive elements for indicating the relative intensities of said currents.

7. An apparatus for measuring the refractive index of a fluid, comprising a closed compartment adapted to be completely filled with said fluid, an elongated cylindrical light-transmitting body extending through the compartment, said body being in contact with said fluid over the total cylindrical surface of said body located within said compartment, the ratio of the axial length to the diameter of said cylindrical surface having a value of at least 8, means comprising a source of light arranged exteriorly of the compartment adjacent one end of the cylindrical body for passing light therethrough in an axial direction, and light sensitive means arranged exteriorly of the compartment adjacent the other end of the cylindrical body for measuring the light emerging therefrom, the amount of said light being a function of the refractive index of the fluid.

GEORGE C. ELTENTON.

REFERENCES CITED

The following references are of record in the file of this patent:

UNITED STATES PATENTS

| Number | Name | Date |
| --- | --- | --- |
| 1,002,635 | Bratkowski | Sept. 5, 1911 |
| 1,230,754 | Moffitt | June 19, 1917 |
| 1,264,374 | De Florez | Apr. 30, 1918 |
| 1,471,342 | Logan | Oct. 23, 1923 |
| 1,542,183 | Steinberg | June 16, 1925 |
| 1,746,525 | Darrah | Feb. 11, 1930 |
| 1,794,222 | Whitney | Feb. 24, 1931 |
| 1,843,981 | Jobst | Feb. 9, 1932 |
| 1,897,141 | Peters | Feb. 14, 1933 |
| 2,044,164 | Gulliksen | June 16, 1936 |
| 2,244,362 | Hartig | June 3, 1941 |
| 2,251,149 | Merckel | July 29, 1941 |
| 2,256,595 | Metcalf | Sept. 23, 1941 |
| 2,324,304 | Katzman | July 13, 1943 |
| 2,358,338 | Lilja et al. | Sept. 19, 1944 |
| 2,394,949 | Straat | Feb. 12, 1946 |
| 2,427,996 | Seaman | Sept. 23, 1947 |